Oct. 1, 1963　　　　　A. FERRI　　　　　3,105,661
DEVICE FOR COOLING AND ENHANCING JET ENGINE
PERFORMANCE OF SUPERSONIC AIRCRAFT
Filed Oct. 9, 1957
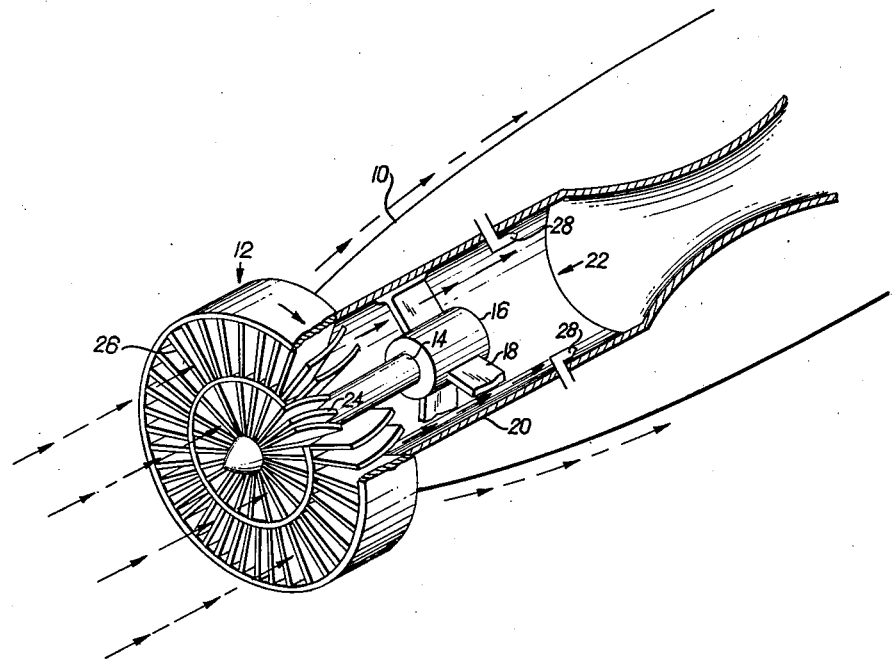
FIG. I
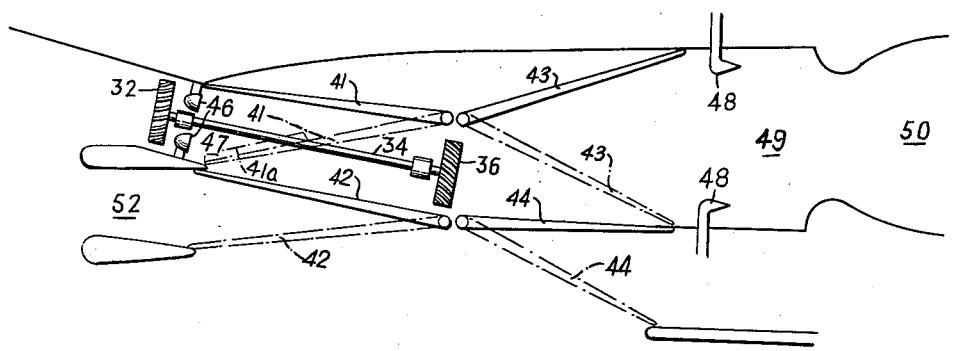
FIG. 2
INVENTOR.
BY Antonio Ferri
Curtis, Morris + Safford United States Patent Office 3,105,661
Patented Oct. 1, 1963

3,105,661
DEVICE FOR COOLING AND ENHANCING JET
ENGINE PERFORMANCE OF SUPERSONIC AIRCRAFT
Antonio Ferri, Rockville Centre, N.Y., assignor to General Applied Science Laboratories, Inc., Westbury, N.Y., a corporation of New York
Filed Oct. 9, 1957, Ser. No. 689,141
1 Claim. (Cl. 244—117)

This invention relates to apparatus for reducing the skin temperature of aircraft flying at supersonic speeds and for increasing the efficiency of the jet engines thereof, particularly in the case of ram jet engines.

In my co-pending application Serial No. 640,935, filed February 18, 1957, now Patent No. 3,005,607, I have disclosed a method and apparatus for cooling of the skin of supersonic aircraft which involves reducing the total temperature of a portion of the air stream around said aircraft by causing it to perform work, such as rotating a turbine, this portion of the air stream then being directed along the skin of the aircraft. This permits a given aircraft to travel at considerably higher speeds without increasing the temperature of the skin to such a level as seriously to impair its structural strength.

In the process of causing a portion of the air stream to perform work, power is generated, and this power may be applied to a useful purpose. According to the present invention, the turbine which is driven by the air stream is used to drive a compressor which supplies compressed air to the ram jet engine of the aircraft, thereby enhancing the performance of the ram jet engine, increasing its combustion efficiency and enabling its operation at high altitudes at which such engines have heretofore been impractical.

In the drawings:

FIGURE 1 is a fragmentary isometric view of the nose of an aircraft incorporating a combination turbine-and-compressor structure embodying features of the present invention, with certain parts being broken away to show their inner construction.

FIGURE 2 is a diagrammatic representation of an alternative embodiment of the present invention including an arrangement for converting a ram jet engine into a turbo jet engine for take-off and acceleration.

In the embodiment shown in FIGURE 1, mounted on the nose 10 of the aircraft is a combination turbine-and-compressor rotor assembly generally designated 12, which is mounted on a shaft 14 rotatably journaled in a bearing 16 supported by radial arms 18 in the air duct 20 which extends from the nose of the aircraft to the combustion chamber 22 of the ram jet engine. The circular center section of the rotor assembly consists of a series of radial blades 24 which are oriented to serve as a compressor, while the outer annular section of the rotor 12 comprises a series of blades 26 which are oppositely oriented to serve as a turbine.

As the aircraft flies through the atmosphere, the portion of the air stream flowing through the turbine blades 26 in the outer annular section of the rotor 12 causes the rotor to rotate at a high speed, as indicated by the arrow in FIGURE 1. The portion of the air stream entering the center section of the rotor is acted upon by the compressor blades 24 and is compressed. This compressed air passes through the duct 20 which is of circular cross-section and generally co-extensive with the center section of the rotor 12. The air in the duct 20 is passed to the combustion chamber 22 where fuel injected through nozzles 28 is combusted and the combusted gases are ejected through the exhaust opening 30 to supply propulsive thrust to the aircraft.

As is more fully disclosed in the aforementioned co-pending application, the turbine blades 26 in the outer section of the rotor 12 have the effect of reducing the total or stagnation temperature and enthalpy of the portion of the air stream passing therethrough. This portion of the air stream passes along the skin of the nose 10 and other parts of the aircraft and to some extent forms a boundary layer of air about it. Since the total temperature of this air is less than that of the ambient air, and since the temperature differential and therefore the heat transfer between this air and the skin of the aircraft is reduced, the amount of heat transferred to the skin of the aircraft, at a given air speed and altitude, is greatly reduced. Stated another way, the aircraft can fly at higher speeds or at lower altitudes without raising the temperature of the skin above a safe level for a given metal composition and thickness.

The pre-compression of the air supplied to the ram jet engine greatly increases the engine efficiency, reducing the specific fuel consumption and permitting the ram jet to operate efficiently at much higher altitudes.

As is well known, the combustion efficiency of a ram jet engine diminishes considerably at higher altitudes. For example, a ram jet engine which would operate efficiently at an air speed of Mach 3.0 at an altitude of 70,000 feet would become very inefficient at the same speed at an altitude of 100,000.

The present invention, by pre-compression of the air supplied to the ram jet engine, makes possible the efficient operation of the engine even at such high altitudes. By way of example, in an aircraft flying at a speed of Mach 3.0 at an altitude of 70,000 feet, the air total temperature would be approximately 1100° Rankine. By the use of a combination turbine-and-compressor of the type described, wherein the ratio of weight flow of gas through the turbine to the weight flow of gas through the compressor is 1.0, the outlet temperature of the turbine—i.e., the total temperature of the air which has been acted upon by the turbine—may be reduced to the order of 900° Rankine, thereby reducing the temperature of the skin of the aircraft. At the same time, the specific fuel consumption (the ratio of the weight of fuel consumed per hour to the propulsive force, where propulsive force is defined as the thrust of the engine minus the drag due to the turbine) is reduced by a factor of the order of 0.7 as compared to the value which would obtain at this altitude and air speed without pre-compression of the air supplied to the jet engine.

By increasing the ratio of the weight flow of gas through the turbine to the weight flow of gas through the compressor to a value of 2.0, the specific fuel consumption can be reduced still further—for example to a level of 0.65 times the normal value. However, the reduction in total temperature of the air passing through the turbine would not be so great—for example, to a temperature on the order of 1,000° R.

On the other hand, if the weight flow ratio is decreased, for example to a value of 0.4, the turbine outlet temperature can be reduced still further to a value as low as 700° R., while the specific fuel consumption will be on the order of 0.8 times that which could be achieved without pre-compression.

The illustrative figures given represent the conditions of operation at which the curves of specific fuel consumption versus turbine outlet temperature are at their minima for a fuel air ratio of .03—in other words, the conditions for minimum fuel consumption. Even greater reductions in turbine outlet temperature can be achieved where required to keep the wall temperature below the tolerance of the specific structural materials employed, but with a corresponding increase in fuel consumption. For example, at a weight flow ratio of 1.0 and a fuel air ratio of .03, the turbine outlet temperature can be reduced as low as 700° R., without increasing the specific fuel consumption above the value which would obtain without pre-compression.

At higher speeds at the same altitude, the increase in engine efficiency due to pre-compression has different characteristics. The curve of specific fuel consumption versus turbine outlet temperature becomes much flatter over a considerable range of turbine outlet temperatures. For example, at an air speed of Mach 4.0 and an altitude of 70,000 and a weight flow ratio of 1.0 the turbine outlet temperature may be reduced from the normal value of 1650° R. to the order of 1300° R. without substantial change in the specific fuel consumption. With a weight flow ratio of 0.4, the outlet temperature may be decreased to 900° R. without any substantial change in specific fuel consumption. These conditions correspond to a fuel air ratio of .03.

However, at greater altitudes the increase in engine efficiency again becomes marked. Without pre-compression, the reduction in pressure produced by an increase in altitude from 70,000 to 100,000 feet, reduces the combustion efficiency of a pure ram jet engine to an almost prohibitive degree. The pre-compression produced by the compressor portion of the rotor 12 has the effect of increasing both the pressure and the temperature in the combustion chamber, both of which factors tend to increase combustion efficiency. The combined effect of these two favorable factors is such as to increase substantially the combustion efficiency and to permit ram jet engines to operate efficiently at altitudes which have not heretofore been practical.

It should be emphasized that all of the above discussion does not take into account the effect of skin friction drag reduction, which effect may be great enough to compensate for the increase in drag produced by the presence of the turbine in the air stream. Therefore in a complete analysis of an engine system the increase in efficiency of the associated aircraft would be greater than has been indicated by the discussion of the engine above.

As is well known, a pure ram jet engine cannot be operated from a standing start but only at air speeds on the order of Mach 1.5 or greater. The alternative embodiment of the invention shown in FIGURE 2 is designed to operate as a turbo jet at lower air speeds and then is convertible to operate as a ram jet at higher speeds, with pre-compression of the air supply. In this construction a compressor 32 is fixed on the same rotatable shaft 34 on which a turbine 36 is mounted. For controlling the path of the air passing through the compressor 32 and turbine 36, a plurality of movable valve flaps 41, 42, 43 and 44 are provided. A set of turbo jet burners 46 are provided in a turbo jet combustion chamber 47 immediately behind the compressor 32 and ahead of the valve flaps 41, 42, and a set of ram jet fuel injection nozzles 48 is provided in a ram jet combustion chamber 49 between the valve flaps 43, 44 and the jet exhaust 50.

For operation from a standing start, for taxiing, takeoff and acceleration, the valve flaps 41—44 are moved to the positions in which they are shown in full lines in FIGURES 2, and fuel is supplied to the turbo jet burners 46. The combusted gases from the turbo jet combustion chamber 47 pass downwardly through the turbine 36 and thence up again to exhaust 50, from which they are expelled to provide propulsive thrust for the aircraft. As will be recognized, this is now a more or less conventional turbo jet arrangement, with the combusted gases from the combustion chamber 47 driving the turbine 36 which in turn drives the compressor 32 to supply compressed air to the combustion chamber 47.

After the aircraft has taken off and has accelerated to such speed as to permit efficient operation of a ram jet engine, the valve flaps are returned to the position in which they are shown in broken lines in FIGURE 2. To prevent interference between the flap 41 and the shaft 34, the flap 41 is provided with a slot normally closed by a spring loaded plate 41a which is opened by engagement with shaft 34 when the flap is moved to the position shown in broken lines. In this position the engine functions as a ram jet with the compressor 32 serving in the manner previously disclosed to pre-compress the air supplied thereto. The turbine 36 serves as an air cooling device, acting upon the portion of the air stream passing through the air intake 52 to reduce the total temperature of the air. This air is then directed from the outlet end of the duct 44 along the skin of the aircraft, either directly or through a manifold and duct system thereby reducing the temperature of the aircraft skin. The turbine 36, being driven by the air passing through it, in turn drives the compressor 32.

It will be appreciated that the present invention greatly contributes to the practicality of ram jet aircraft, not only by making it possible to use metals heretofore unsuitable for use in very high speed aircraft, and reducing the necessary skin thickness and therefore the weight of such aircraft, but also by enhancing the efficiency of the ram jet engines and making it possible for them to fly at altitudes at which their operation has heretofore been impractical.

However, it should be emphasized that the particular embodiments of the invention which are shown and described herein are intended as merely illustrative of the principles of the invention rather than as restrictive of the scope thereof or of the coverage of this patent, which is defined only by the appended claim.

I claim:

In a jet aircraft having a nose portion with a generally circular air scoop therein communicating with the combustion chamber of a jet engine, means for cooling the skin of said aircraft and enhancing operation of said jet engine, comprising a combination turbine-and-compressor assembly rotatably mounted in front of and concentric with said air scoop at said nose portion, and having at its central portion a concentric circular section generally coextensive with said air scoop comprised of blades oriented to serve as a compressor and at its outer portion a concentric annular section comprised of blades oppositely oriented to serve as a turbine, whereby the air passing through the outer portion of said assembly will be directed along the outer surface of the skin of said aircraft and will cause rotation of said assembly to compress the air passing through the central portion of said assembly and to the combustion chamber of said jet engine.

References Cited in the file of this patent

UNITED STATES PATENTS

| 2,405,919 | Whittle | Aug. 13, 1946 |
| 2,637,984 | Bloomberg | May 12, 1953 |
| 2,644,298 | McLeod | July 7, 1953 |
| 2,696,079 | Kappus | Dec. 7, 1954 |
| 2,840,986 | Davies et al. | July 1, 1958 |
| 2,974,478 | Sweet et al. | Mar. 14, 1961 |

FOREIGN PATENTS

| 554,906 | Germany | Nov. 2, 1932 |